(12) United States Patent
Khayrallah et al.

(10) Patent No.: US 9,397,819 B2
(45) Date of Patent: Jul. 19, 2016

(54) EXTENSION CARRIER FOR ARQ

(71) Applicant: Telefonaktiebolaget L M Ericsson (publ), Stockholm (SE)

(72) Inventors: Ali S. Khayrallah, Mountain View, CA (US); Jung-Fu Cheng, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 496 days.

(21) Appl. No.: 13/633,226

(22) Filed: Oct. 2, 2012

(65) Prior Publication Data

US 2014/0092784 A1 Apr. 3, 2014

(51) Int. Cl.
*H04J 3/16* (2006.01)
*H04L 5/14* (2006.01)
*H04L 1/18* (2006.01)

(52) U.S. Cl.
CPC .......... *H04L 5/14* (2013.01); *H04L 1/1887* (2013.01); *H04L 1/1896* (2013.01)

(58) Field of Classification Search
USPC ......................................... 370/280, 329, 281
See application file for complete search history.

(56) References Cited

U.S. PATENT DOCUMENTS

| 8,908,609 | B1 * | 12/2014 | Naden et al. ................... 370/329 |
| 2005/0207345 | A1 * | 9/2005 | Onggosanusi et al. ....... 370/236 |
| 2005/0246417 | A1 * | 11/2005 | Raith .................... H04L 1/0017 709/203 |
| 2006/0084389 | A1 * | 4/2006 | Beale et al. ................. 455/67.11 |
| 2007/0054645 | A1 * | 3/2007 | Pan .............................. 455/266 |
| 2008/0144572 | A1 * | 6/2008 | Makhijani .................... 370/330 |
| 2010/0296389 | A1 | 11/2010 | Khandekar et al. |
| 2011/0243048 | A1 * | 10/2011 | Wang et al. ................... 370/311 |
| 2012/0069795 | A1 | 3/2012 | Chung et al. |
| 2012/0213141 | A1 * | 8/2012 | Damnjanovic ............... 370/312 |
| 2012/0230272 | A1 * | 9/2012 | Kim et al. .................... 370/329 |

(Continued)

FOREIGN PATENT DOCUMENTS

WO 2011096683 A2 8/2011

OTHER PUBLICATIONS

3rd Generation Partnership Project. "3rd Generation Partnership Project; Technical Specification Group Radio Access Network; Evolved Universal Terrestrial Radio Access (E-UTRA); Physical layer procedures (Release 10)." 3GPP TS 36.213, V10.2.0, Jun. 2011, Sophia Antipolis Valbonne, France.

(Continued)

*Primary Examiner* — Zewdu A Beyen
(74) *Attorney, Agent, or Firm* — Coats & Bennett, P.L.L.C.

(57) ABSTRACT

According to one or more embodiments described and claimed herein, HARQ acknowledgements, re-transmissions, and related signaling (e.g., channel quality reports) are performed on a Re-transmission Extension Carrier (REC) separate from the primary downlink traffic carrier(s). In various embodiments, as explained herein, the REC may comprise an aggregated wireless communication network channel, which may be cross-channel scheduled or may have its own scheduler. The REC may be Frequency Domain Duplex (FDD) or Time Domain Duplex (TDD). The REC may be dedicated to a main downlink carrier, or may be shared across a plurality of aggregated component carriers. The REC may be transmitted from the same base station as one or more associated main carriers, or from a different base station. A shared REC may be operated in cooperative or contention modes. The REC may be implemented in unlicensed spectrum.

30 Claims, 13 Drawing Sheets

(56) References Cited

U.S. PATENT DOCUMENTS

2012/0320853 A1    12/2012   Kwon et al.
2014/0031031 A1*   1/2014    Gauvreau et al. .......... 455/426.1

OTHER PUBLICATIONS

3rd Generation Partnership Project. "3rd Generation Partnership Project; Technical Specification Group Radio Access Network; Evolved Universal Terrestrial Radio Access (E-UTRA); Multiplexing and channel coding (Release 10)." 3GPP TS 36.212, V10.2.0, Jun. 2011, Sophia Antipolis Valbonne, France.

3rd Generation Partnership Project. "3rd Generation Partnership Project; Technical Specification Group Radio Access Network; Evolved Universal Terrestrial Radio Access (E-UTRA); Physical Channels and Modulation (Release 10)." 3GPP TS 36.211, V10.2.0, Jun. 2011, Sophia Antipolis Valbonne, France.

* cited by examiner

EXTENSION CARRIER FOR ARQ

FIELD OF INVENTION

The present invention relates generally to wireless communication networks, and in particular to an extension carrier for ARQ re-transmission traffic.

BACKGROUND

A base station in a wireless communication network provides wireless communications services to a large plurality of User Equipment (UE) within its service area, or cell. Each base station generally includes a scheduling function, which schedules downlink transmissions to numerous UE according to several criteria (e.g., amount of data for each UE, channel quality reported by each UE, UE bit rate capability, amount of data recently transmitted to a UE, and the like). Efficient scheduling improves overall throughput. For example, in proportionally fair scheduling, more data is transmitted to UE experiencing the best channel conditions, with UE experiencing poor channel conditions being served just often enough to maintain an acceptable level of performance. A recent development in wireless communication network technology is the cooperative scheduling of traffic between multiple cells, which can reduce inter-cell interference.

Radio Frequency (RF) signals transmitted across an air interface experience interference and noise, distorting the signal and introducing errors in the data extracted from the signal at a receiver. Accordingly, error detection and correction techniques are critical to digital wireless communications. Indeed, to maximize overall performance, system parameters are often adjusted to achieve a predetermined, non-zero error rate, e.g., 10% Block Error Rate (BLER).

A simple error detection scheme is to add a parity bit to a block of bits, the parity bit value set to ensure that the number of bits with the value 1 in the block is even or odd. The receiver performs a parity check by counting the number of 1's in the block, and comparing the result to the parity bit. A more advanced system for error detection is the Cyclic Redundancy Check (CRC). A type of hash function is performed on a block of data, and the result is appended to and transmitted with the block. A receiver performs the same calculation, and compares its result to the received CRC value to detect errors. Numerous other error detection schemes are known in the art; for example, Forward Error Correction (FEC) coding encodes sufficient redundancy into a data block for the receiver to perform not only error detection, but also unassisted correction of some errors.

Automatic Repeat reQuest (ARQ) is simple error correction scheme in which a receiver, upon detecting an error, requests a retransmission of a block of data. The receiver may explicitly acknowledge each data block, by transmitting an acknowledgment (ACK) if no errors are detected or a negative acknowledgment (NAK) if the block was received with one or more errors. Alternatively, ACKs may be implicit, with the receiver only transmitting a NAK in the case of a detected error. The transmitter retains a copy of each transmitted data block until the receipt of an ACK/NAK, or in the case of implicit acknowledgment, until either a NAK is received or a timeout occurs.

Upon receiving a NAK, the transmitter re-transmits coded data based on the original data block. When the retransmission is based on repetition of previously sent coded bits, the transmitter is operating in a Chase combining HARQ protocol. When the retransmission contains coded bits unused in previous transmission attempts, it is operating in an incremental redundancy HARQ protocol. The receiver may replace the erroneously received data block with the re-transmitted one, or may combine the two, and additionally utilize FEC codes, to correct the errors. Since the re-transmission itself may be received with errors, it may be NAK'ed, prompting another re-transmission. Various wireless communication system protocols define a maximum number of re-transmission attempts, after which higher-layer error recovery techniques are invoked. In the following, we will use re-transmission to mean both the case of repetition of previously sent coded bits, and the case of coded bits unused in previous transmission attempts, and the combination of the two.

An ARQ or HARQ scheme is simple to implement at both the transmitter and receiver, minimally degrades performance, adds little overhead to the transmitted signals, and not only allows the system to recover from inevitable errors, but allows the system to be purposefully operated with a desired non-zero error rate. However, while the overall error rate may be tuned (e.g., 10% BLER), the timing of individual block errors, and hence the timing of NAKs and HARQ re-transmissions, is random. This random injection of required transmissions prevents the scheduler from operating as efficiently as it could if all its transmissions in a given frame were deterministic. HARQ re-transmissions also impede the ability to coordinate schedulers across cells.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure is not intended to identify key/critical elements of embodiments of the invention or delineate the scope of the invention. The sole purpose of this summary is to present some concepts disclosed herein in a simplified form as a prelude to the more detailed description that is presented later.

According to one or more embodiments described and claimed herein, HARQ acknowledgements, re-transmissions, and related signaling (e.g., channel quality reports) are performed on a Re-transmission Extension Carrier (REC) separate from the primary downlink traffic carrier(s). In various embodiments, as explained herein, the REC may comprise an aggregated wireless communication network channel, which may be cross-channel scheduled or may have its own scheduler. The REC may be Frequency Domain Duplex (FDD) or Time Domain Duplex (TDD). The REC may be dedicated to a downlink primary component carrier (PCC), or may be shared across a plurality of aggregated component carriers (CC). The REC may be transmitted from the same base station as one or more associated CCs, or from a different base station. A shared REC may be operated in cooperative or contention modes. The REC may be implemented in licensed or unlicensed spectrum.

One embodiment relates to a method of operating a base station. Data to be transmitted to one or more UE is received. Transmission of a block of data to the UE is scheduled in a first scheduler. The block of data is transmitted to a UE on a first CC. A NAK is received from the UE indicating one or more errors in the received data block. The block of data is re-transmitted to the UE on a REC separate from the first CC.

Another embodiment relates to a method of transmitting HARQ re-transmissions on a REC. A first block of data previously transmitted to a first UE on a first carrier other than the REC is received, the previous transmission having been NAK'ed by the first UE as containing one or more errors. The first block of data is transmitted to the first UE on the REC.

Yet another embodiment relates to a base station operative in a wireless communication network. The base station includes a first transceiver operative to transmit data to UE on at least a first CC; a network interface operative to exchange data with one or more network nodes; memory; and a controller operatively connected to the memory, the transceiver, and the network interface. The controller is operative to receive, via the network interface, data to be transmitted to one or more UE; schedule transmission of a block of data to the UE on the first CC; cause the first transceiver to transmit the block of data to a UE on the first CC; receive, from the transceiver, a NAK from the UE indicating one or more errors in the received data block; and cause the block of data to be re-transmitted to the UE by means other than on the first CC.

Still another embodiment relates to a UE operative in a wireless communication network. The UE includes a transceiver operative to receive and transmit data from and to a base station on at least a first CC; memory; and a controller operatively connected to the memory and the transceiver. The controller is operative to receive, from the transceiver, data transmitted by the base station on the first CC; receive, from the decoder, error detection on the received data; in the case of a detected error, cause the transceiver to transmit a NAK to the base station on the first CC; and receive, from the transceiver, a re-transmission of the data by means other than the first CC.

If the base station is equipped with more one antenna (or one antenna per sector) and is capable of performing Multiple Input Multiple Output (MIMO) transmissions, more than one block of data may be transmitted or re-transmitted in the above disclosed schemes. In a normal feedback mode, the UE will send back a number of ACK/NAK indicators corresponding to the more than one block of data transmitted from the base station. In a second bundled feedback mode, the UE will send back one ACK/NAK indicator with value ACK indicating whether all the received blocks of data are correct and with value NAK indicating at least one of the received data blocks is in error. In the case of a NAK, the base station shall retransmit the multiple blocks of data.

DETAILED DESCRIPTION

Figure 1:
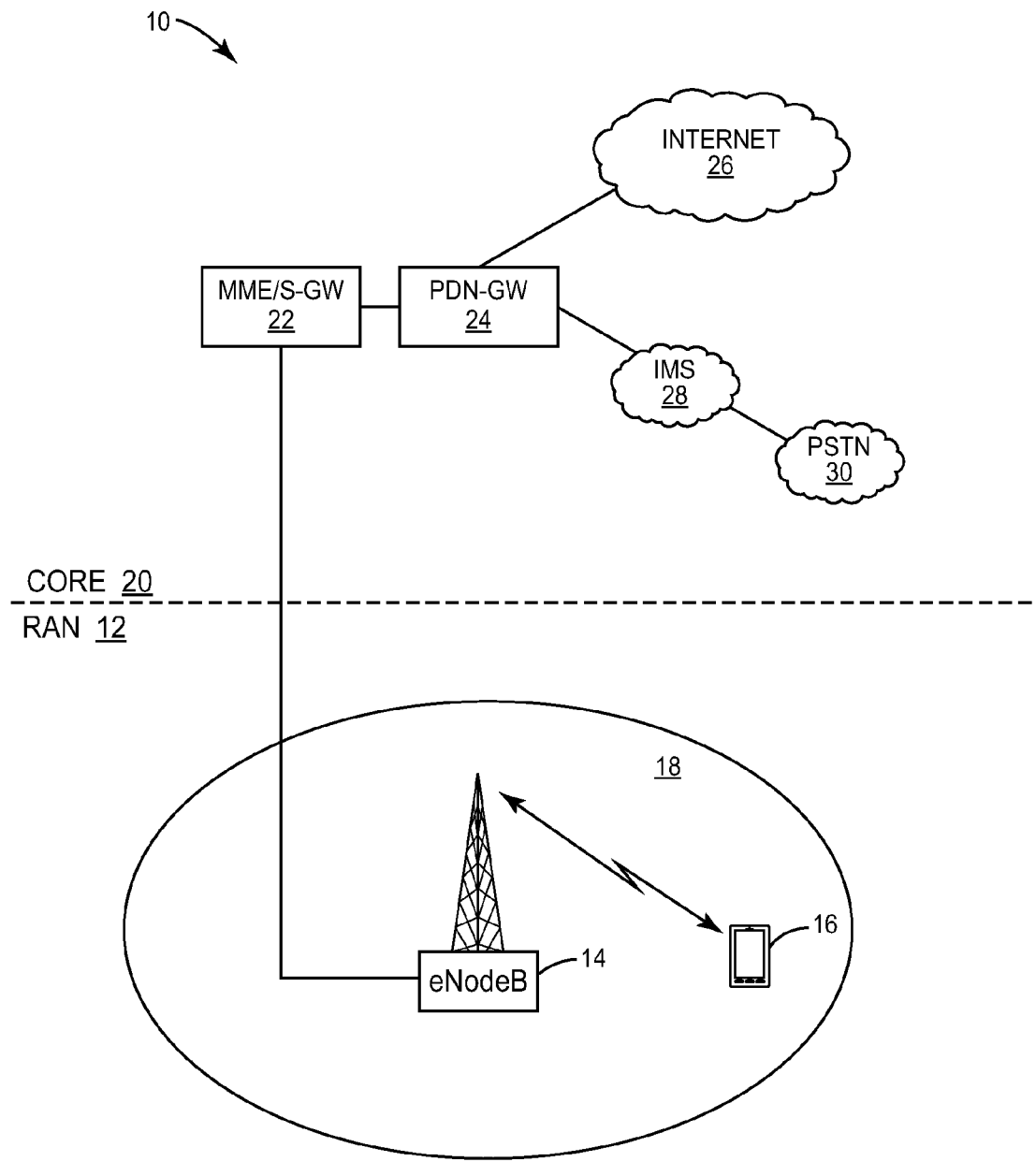
FIG. 1 is a functional block diagram of an LTE wireless communication network.

FIG. 1 depicts a high-level, functional block diagram of a wireless communication network 10. The network 10 depicted in FIG. 1 conforms to the 3GPP Long Term Evolution (LTE) protocol and its extensions, which is the context in which embodiments of the present invention are explained. However, the present invention is not limited to networks 10 conforming to the LTE protocol.

A Radio Access Network (RAN) 12, e.g., E-UTRAN, comprises one or more base stations 14, known in LTE as eNodeBs. Each eNodeB 14 provides wireless communication service to a plurality of User Equipment (UE) 16 within a geographical area, or cell 18. A core network 20 comprises a plurality of communicatively-linked nodes, such as a Mobility Management Entity (MME) and Serving Gateway (S-GW) 22. The MME-S-GW 22 connects to numerous nodes (not all of which are depicted for simplicity), including a Packet Data Network Gateway (PDN-GW) 24. The PDN-GW 24 provides connectivity to packet data networks such as the Internet 26, and through an IP Multimedia Subsystem (IMS) 28 to the Public Switched Telephone Network (PSTN) 30.

LTE Channel Structure

Figure 2:
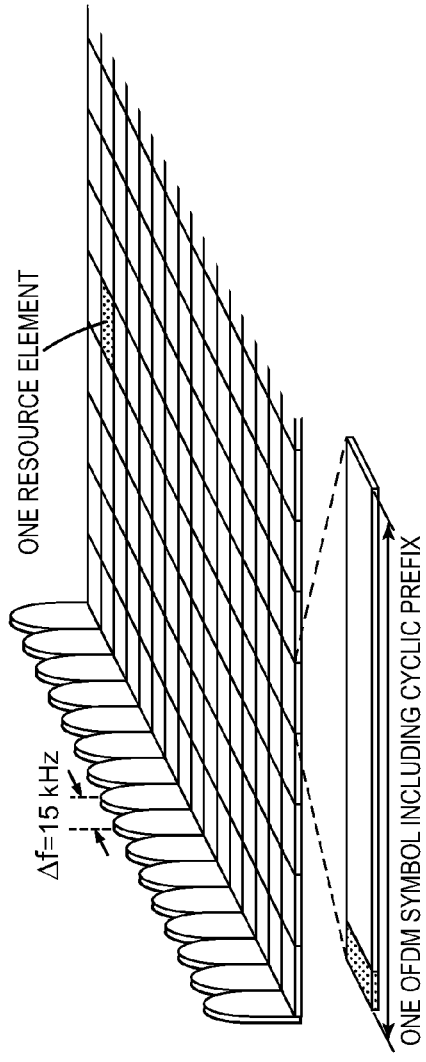
FIG. 2 is a time-frequency diagram of an OFDM downlink signal.

LTE uses Orthogonal Frequency Division Multiplex (OFDM) modulation in the downlink (and DFT-spread OFDM in the uplink). The basic LTE downlink physical resource can thus be seen as a time-frequency grid as illustrated in FIG. 2. Each resource element corresponds to one OFDM subcarrier (15 KHz) during one OFDM symbol interval.

Figure 3:
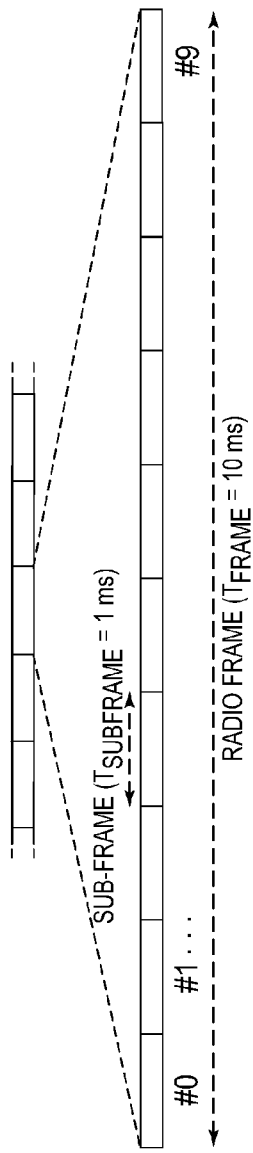
FIG. 3 is a graph depicting LTE frames and subframes.

In the time domain, LTE downlink transmissions are organized into radio frames of 10 ms, each radio frame consisting of ten equally-sized subframes of length $T_{subframe}$=1 MS, as illustrated in FIG. 3.

Resource allocation in LTE is typically described in terms of resource blocks (RB), where a resource block corresponds to one slot (0.5 ms) in the time domain and 12 contiguous subcarriers in the frequency domain. A pair of two adjacent resource blocks in the time direction (1.0 ms) is known as a resource block pair. Resource blocks are numbered in the frequency domain, starting with 0 from one end of the system bandwidth.

Figure 4:
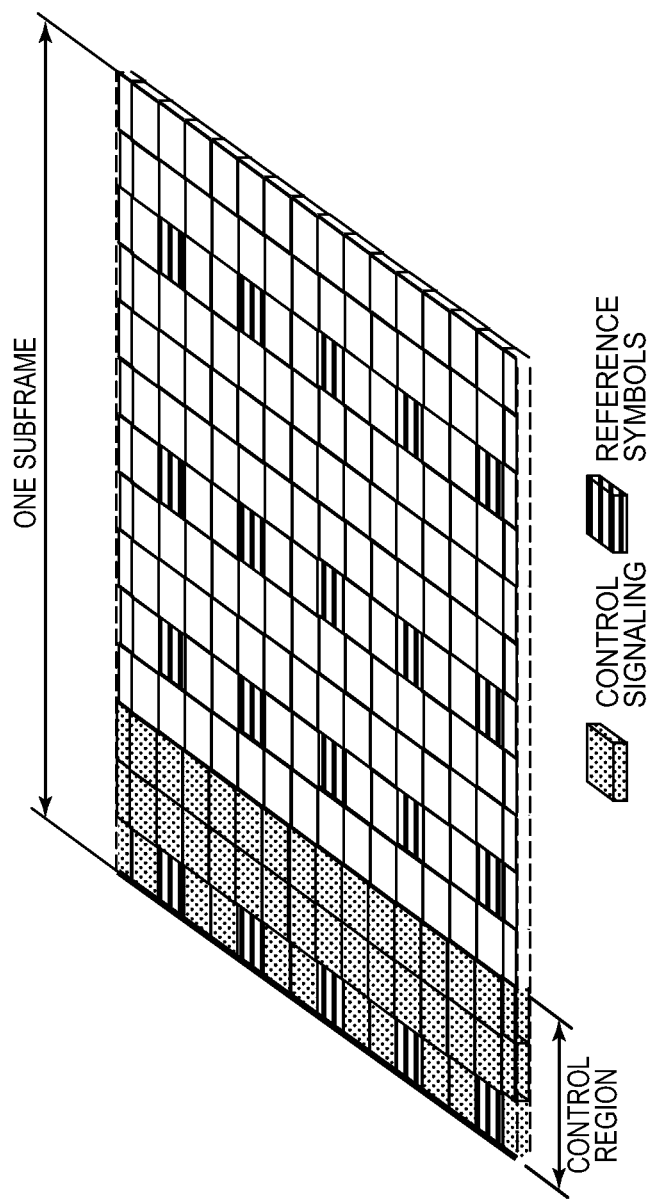
FIG. 4 is a time-frequency diagram depicting control and reference signaling.

Downlink transmissions are dynamically scheduled, i.e., in each subframe the base station 14 transmits control information specifying to which UE 16 data is transmitted, and on which resource blocks, in the current downlink subframe. This control signaling is typically transmitted in the first 1, 2, 3 or 4 OFDM symbols in each subframe, and the number n=1, 2, 3 or 4 is known as the Control Format Indicator (CFI). The CFI is transmitted as the first symbol in the control channel, and is assigned the logical channel Physical Control Format Indicator Channel (PCFICH). FIG. 4 depicts a downlink transmission with three OFDM symbols dedicated to control (i.e., CFI=3). The downlink subframe also contains common reference symbols (CRS), which are known to the receiver and used for coherent demodulation of e.g. the control information.

Dynamic scheduling information is communicated to the UEs 16 via the Physical Downlink Control Channel (PDCCH) transmitted in the control region. After successful decoding of a PDCCH, the UE 16 shall perform either reception of the Physical Downlink Shared Channel (PDSCH), using the CFI from the PCFICH to determine where the PDSCH begins, or transmission on the Physical Uplink Shared Channel (PUSCH), according to pre-determined timing specified in the LTE specifications.

Duplex Operation

Figure 5C:
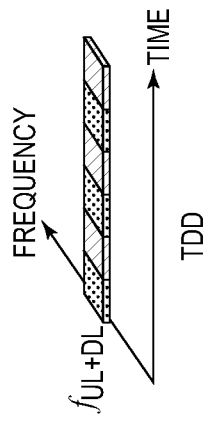
FIGS. 5A-5C are time-frequency diagrams depicting FDD and TDD operation.
Figure 5B:
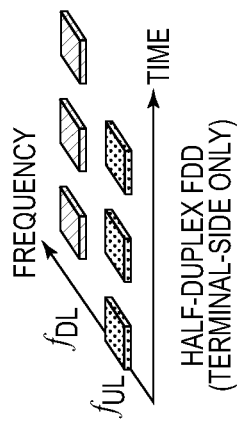
Figure 5A:
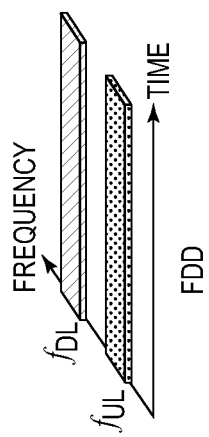

Transmission and reception to and from a UE 16 can be multiplexed in the frequency domain or in the time domain, or combinations thereof. FIG. 5A depicts full-duplex Frequency Division Duplex (FDD), in which downlink and uplink transmission take place concurrently in different, sufficiently separated, frequency bands. FIG. 5B depicts half-duplex FDD, which occurs in the UE 16, as discussed below. FIG. 5C depicts Time Division Duplex (TDD), in which downlink and uplink transmissions take place in different, non-overlapping time slots in the same frequency band. Thus, TDD can operate in unpaired spectrum, whereas FDD (whether full- or half-duplex) requires paired spectrum.

Figure 6:
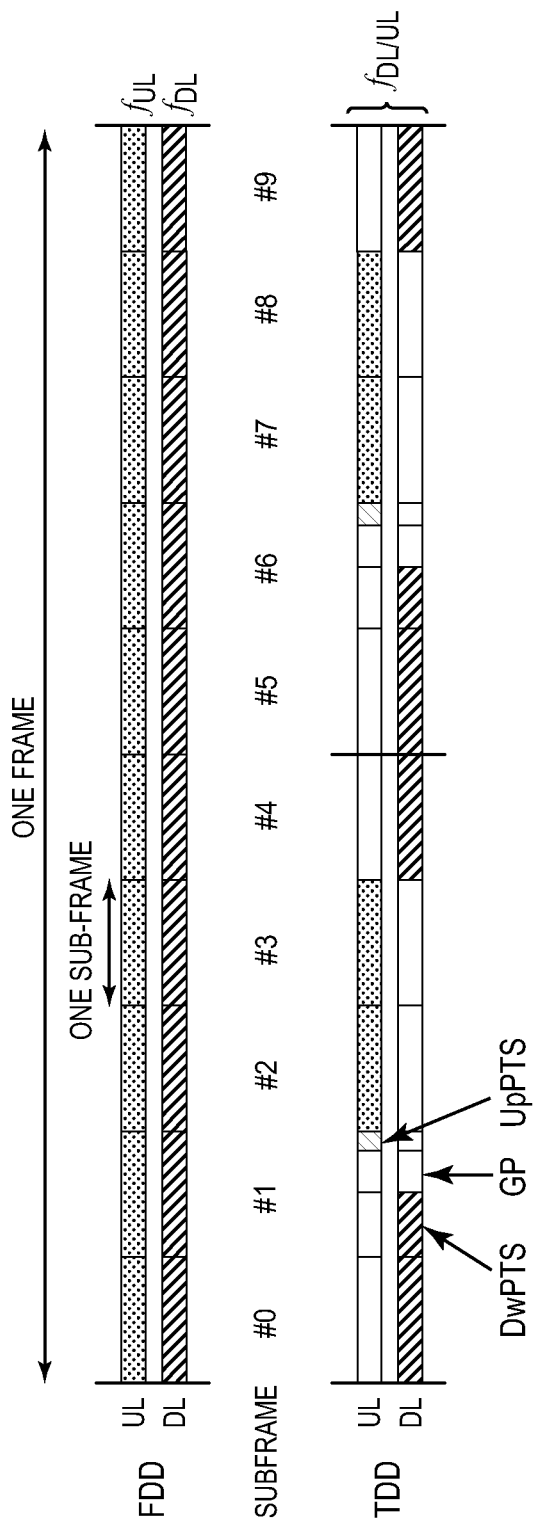
FIG. 6 is a subframe diagram depicting FDD and TDD operation.

Signals transmitted in a wireless communication network are typically temporally organized in the form of a frame structure. For example, FIG. 6 depicts the ten equally-sized subframes, each of 1 msec. duration, that make up an LTE frame.

In the case of FDD operation (depicted in the upper part of FIG. 6), there are two carrier frequencies, one for uplink transmission ($f_{UL}$) and one for downlink transmission ($f_{DL}$). At least with respect to the UE 16 in a wireless communication network, FDD can be either full duplex (FIG. 5A) or half duplex (FIG. 5B). In the full duplex case, a UE 16 can transmit and receive simultaneously, while in half-duplex operation, the UE 16 alternates between transmit and receive operation. The base station 14 is always capable of simultaneous reception/transmission, e.g., receiving uplink signals from one UE 16 while simultaneously transmitting in the downlink to another UE 16. In LTE, a half-duplex UE 16 monitors (or receives data) on the downlink except when explicitly instructed to transmit in a certain subframe.

In the case of TDD operation (depicted in the lower part of FIG. 6), only a single carrier frequency is used, and uplink and downlink transmissions are always separated in time (and also on a cell basis). Since the same carrier frequency is used for uplink and downlink transmission, both the base station 14 and the UE 16 must switch from transmission to reception and vice versa. An essential aspect of any TDD system is to provide the possibility for a sufficiently large guard time in which neither downlink nor uplink transmissions occur. This is required to avoid interference between uplink and downlink transmissions. For LTE, this guard time is provided by special subframes (subframe 1 and, in some cases, subframe 6), which are split into three parts: a downlink part (DwPTS), a guard period (GP), and an uplink part (UpPTS). The remaining subframes are either allocated to uplink or downlink transmission.

Figure 7:
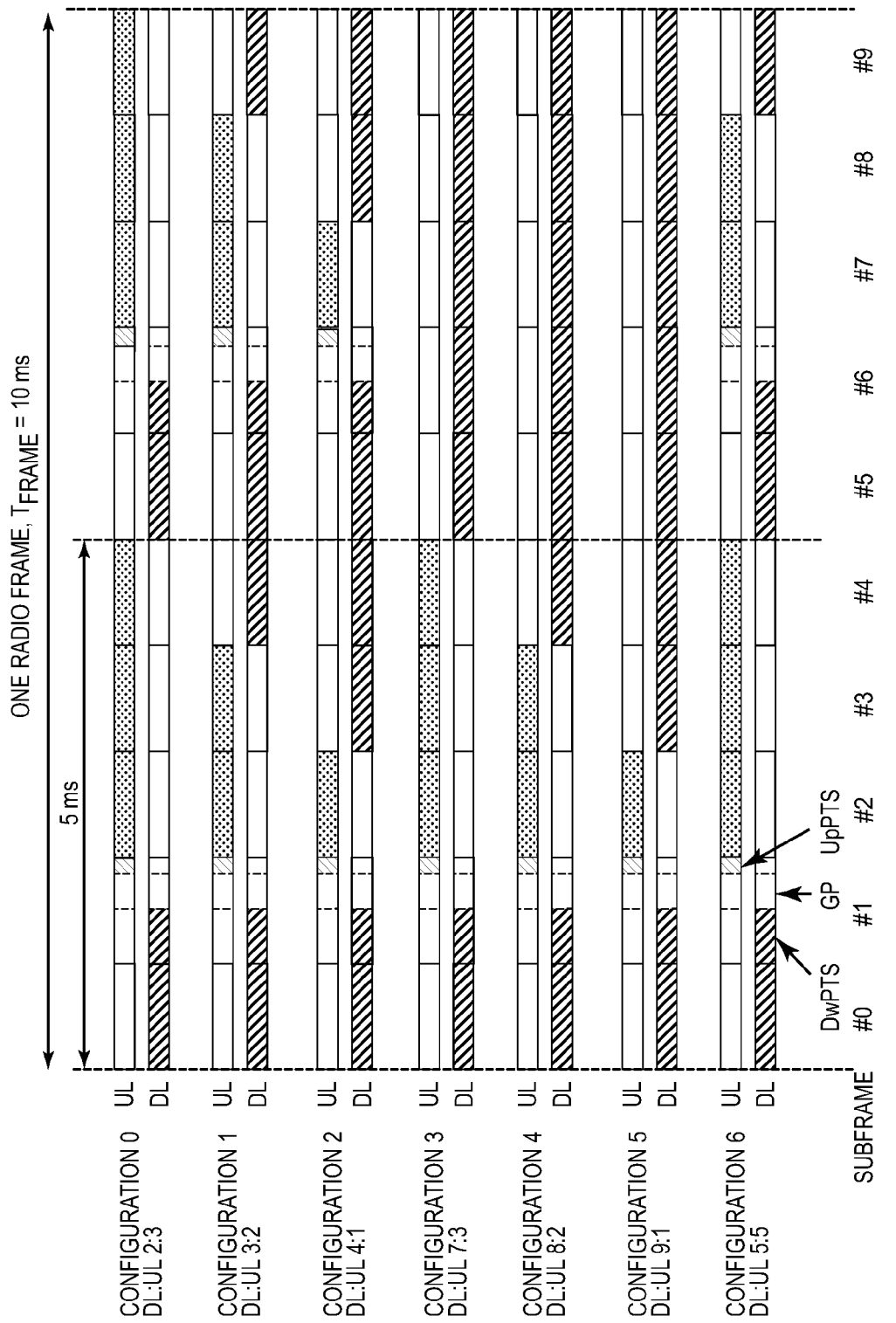
FIG. 7 depicts all LTE-defined TDD subframe configurations.

TDD allows for different asymmetries in terms of the amount of resources allocated for uplink and downlink transmission, by means of different configurations. FIG. 7 depicts seven different TDD configurations defined for LTE. As used herein, a DL subframe may refer to either a dedicated DL subframe or the special subframe.

LTE Carrier Aggregation

Release 10 of the LTE specification defines carrier aggregation. In particular, Rel-10 supports Component Carrier (CC) bandwidths up to 20 MHz (which is the maximum LTE Rel-8 carrier bandwidth). Hence, an LTE Rel-10 operation wider than 20 MHz is possible, and appears as a plurality of LTE carriers to an LTE Rel-10 UE 16.

Figure 8:
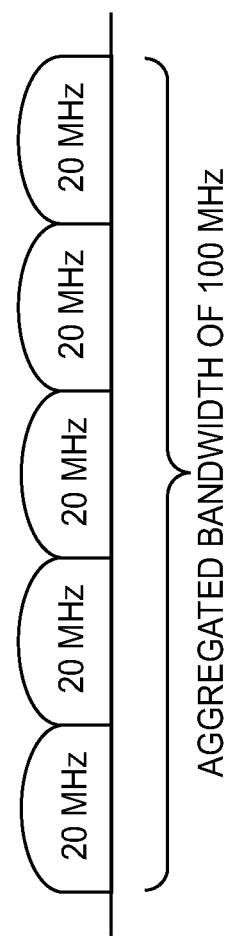
FIG. 8 is a frequency graph depicting carrier aggregation.

Particularly for early LTE Rel-10 deployments, it can be expected that there will be a smaller number of LTE Rel-10-capable terminals compared to many LTE legacy terminals. Therefore, it is necessary to ensure an efficient use of a wide carrier also for legacy terminals, i.e., that it is possible to implement carriers where legacy terminals can be scheduled in all parts of the wideband LTE Rel-10 carrier. The straightforward way to obtain this is by use of Carrier Aggregation (CA). CA implies that an LTE Rel-10 terminal can receive multiple CC, where the CC have, or at least the possibility to have, the same structure as a Rel-8 carrier. One example of CA is illustrated in FIG. 8, depicting five contiguous 20 MHz CC aggregating to 100 MHz bandwidth. In general, CC need not be frequency-contiguous.

The Rel-10 standard supports up to five aggregated carriers where each carrier is limited in the RF specifications to have a one of six bandwidths, namely: 6, 15, 25, 50, 75, or 100 RB (corresponding to 1.4, 3, 5, 10, 15, and 20 MHz, respectively).

The number of aggregated CC, as well as the bandwidth of the individual CC, may be different for uplink and downlink. A symmetric configuration refers to the case where the number of CC in downlink and uplink is the same; an asymmetric configuration refers to the case where the number of CC is different. It is important to note that the number of CC configured in the network may be different from the number of CC seen by a terminal: A terminal may for example support more downlink CC than uplink CC, even though the network offers the same number of uplink and downlink CC.

During initial access, an LTE Rel-10 terminal behaves similarly to a LTE Rel-8 terminal. Upon successful connection to the network a terminal may—depending on its own capabilities and the network—be configured with additional CC in the UL and DL. Configuration is based on Radio Resource Control (RRC).

Scheduling of a CC is done on the PDCCH via downlink assignments. Control information on the PDCCH is formatted as a Downlink Control Information (DCI) message. In Rel-8 LTE, a terminal only operates with one DL and one UL CC; therefore, the association between DL assignment, UL grants and the corresponding DL and UL CCs is clear. In Rel-10, however, two modes of CA must be distinguished: The first case is very similar to the operation of multiple Rel-8 terminals—a DL assignment or UL grant contained in a DCI message transmitted on a CC is either valid for the DL CC itself or for associated UL CC. A second mode of operation augments a DCI message with the Carrier Indicator Field (CIF). A DCI containing a DL assignment with CIF is valid for the DL CC indicted with CIF, and a DCI containing an UL grant with CIF is valid for the indicated UL CC.

LTE ARQ

As discussed above, a wireless communication network 10 employing an ARQ scheme may be operated with a certain error level target. That is, given the channel quality, the base station 14 chooses a bit rate for each initial transmission that aims for a predetermined target error rate. For example, the target may be 10% block error rate (BLER). In this case, on average, a first re-transmission will be necessary approximately 10% of the time. Further re-transmissions are less likely. Hence, even in system set to achieve a target error rate, the volume of re-transmissions is relatively small compared to that of first transmissions.

Figure 9:
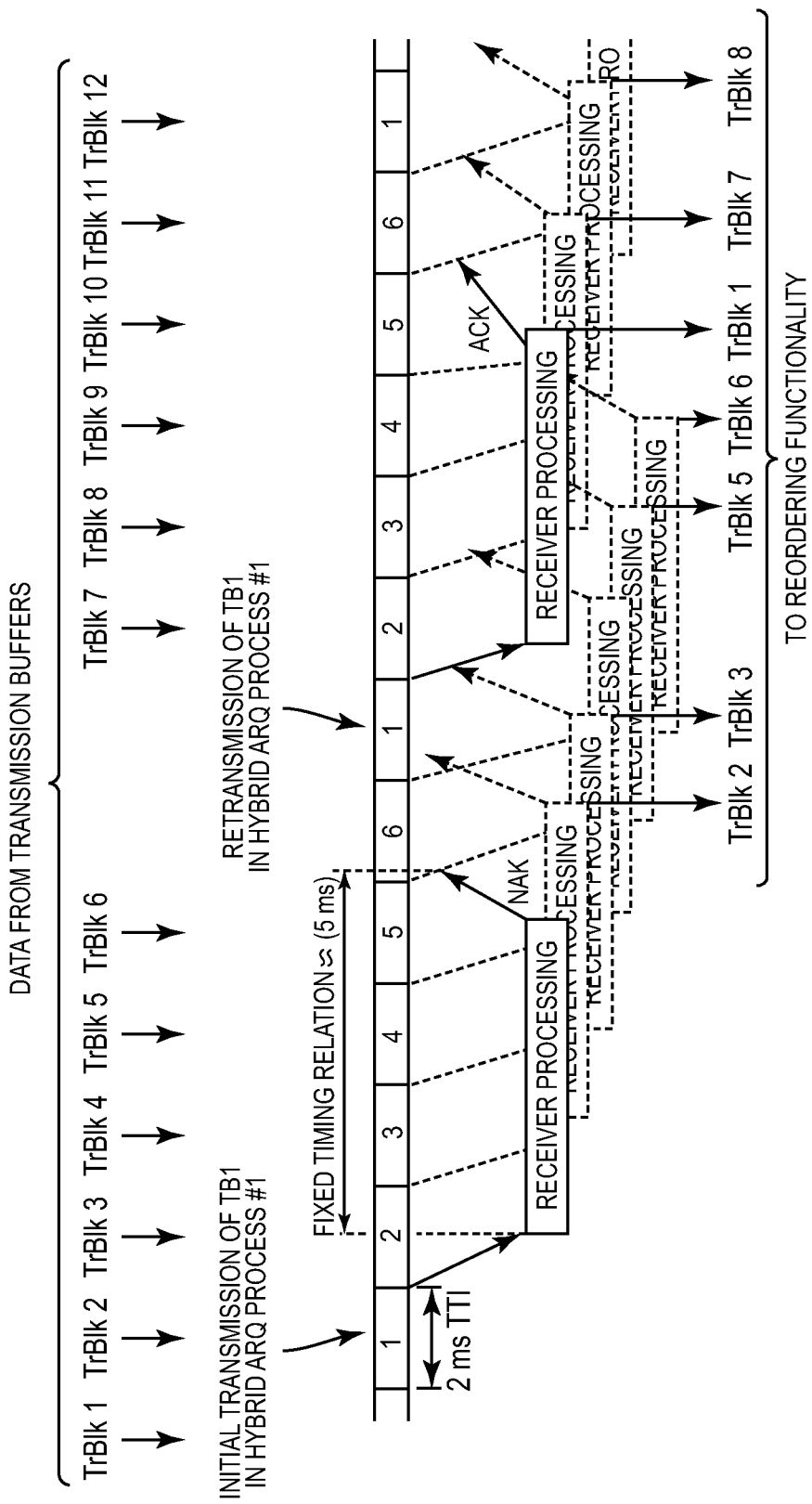
FIG. 9 is a diagram depicting data transmission and HARQ ACK/NAK timing.
Figure 10:
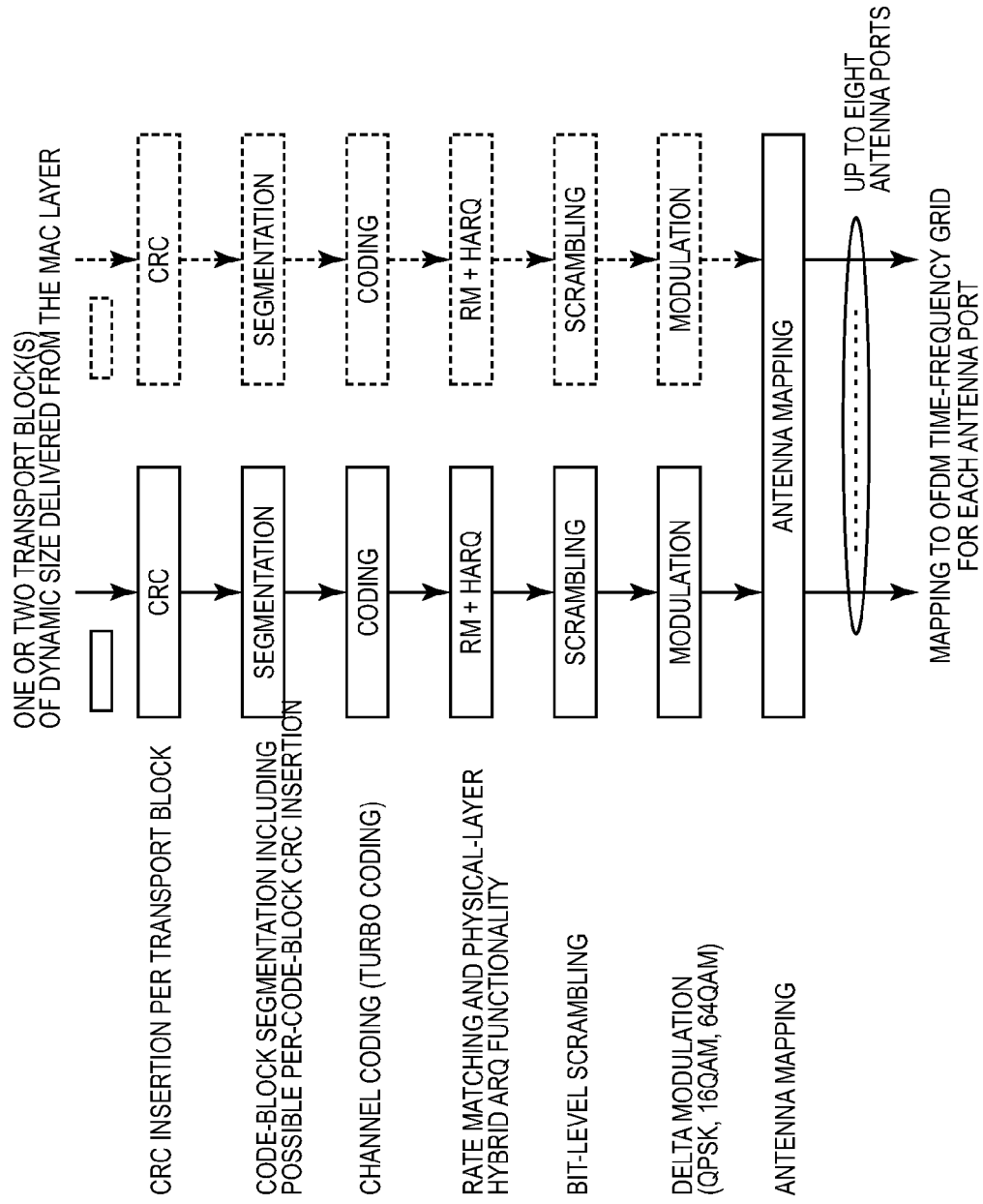
FIG. 10 is a flow diagram depicting PDSCH channel processing.

In Rel-10 LTE, a UE 16 is notified by the network of downlink data transmission by the physical downlink control channel (PDCCH). Upon reception of a PDCCH in a particular subframe n, a UE 16 is required to decode the corresponding physical downlink share channel (PDSCH) and to send ACK/NAK feedback in a subsequent subframe n+k. This is illustrated in FIG. 9. The ACK/NAK feedback informs the eNodeB whether the corresponding PDSCH data was decoded correctly. When the eNodeB detects an ACK feedback, it can discard the data from the associated buffer, and possibly proceed to send new data blocks to the UE 16. When a NAK is detected by the eNodeB, coded bits corresponding to the original data block will be retransmitted. In order for the UE 16 to determine whether the decoded data is correct, a cyclic redundancy check (CRC) coding is applied to the data prior to its transmission. The processing of PDSCH data is depicted in flow diagram form in FIG. 10.

In LTE, the ACK/NAK feedback is sent by the UE 16 using one of the two possible approaches, depending on whether the UE 16 is simultaneously transmitting on a physical uplink shared channel (PUSCH). If so, the ACK/NAK is sent on the PUSCH. Otherwise, the ACK/NAK feedback is sent via a physical uplink control channel (PUCCH). In Rel-10 LTE, the transmission of PUCCH is mapped onto one specific uplink CC, the UL Primary CC (UL PCC).

The ARQ process introduces a random component to the scheduler of the main carrier, which could operate more efficiently if it were more predictable. The random ARQ re-transmissions also prevent the most effective use of advanced scheduling techniques that cover multiple cells.

If the base station is equipped with more one antenna (or one antenna per sector) and is capable of performing Multiple Input Multiple Output (MIMO) transmissions, more than one block of data may be transmitted or re-transmitted in the above disclosed schemes. In a normal feedback mode, the UE will send back a number of ACK/NAK indicators corresponding to the more than one block of data transmitted from the base station. In a second bundled feedback mode, the UE will send back one ACK/NAK indicator with value ACK indicating whether all the received blocks of data are correct and with value NAK indicating at least one of the received data blocks is in error. In the case of a NAK, the base station shall retransmit the multiple blocks of data.

Re-transmission Extension Carrier

Figure 11:
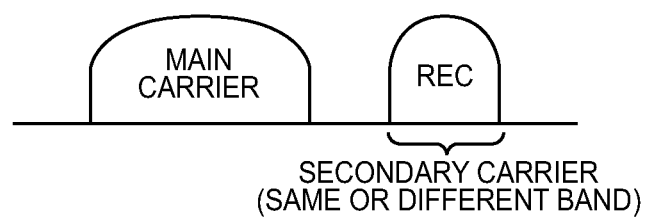
FIG. 11 is a frequency graph depicting a Re-transmission Extension Carrier.

Release 11 of the LTE specification introduces extension carriers. According to one embodiment of the present invention, ARQ/HARQ re-transmissions are shifted from the carrier on which the first transmission occurs—referred to herein as the "main carrier," although in a given implementation it may be the Primary CC or a Secondary CC—to an extension carrier. FIG. 11 depicts a main carrier and a Re-transmission Extension Carrier (REC).

Figure 12:
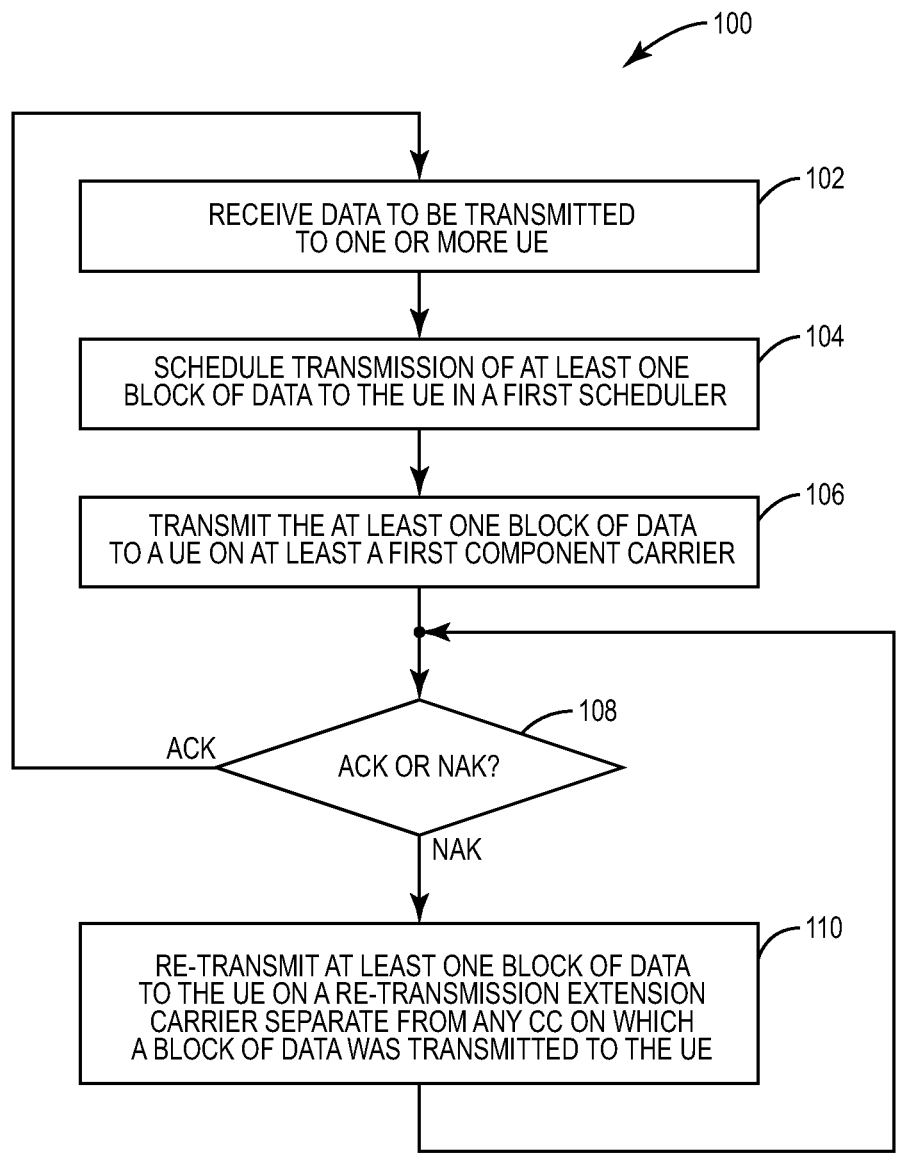
FIG. 12 is a flow diagram of a method of operating a base station employing REC.

FIG. 12 illustrates a method 100 of operating a base station 14 in a wireless communication network 10 implementing a REC. Data to be transmitted to one or more UEs 16 are received at the base station 14 (block 102). Transmission of a block of data to a UE 16 is scheduled on a first carrier (i.e., the main carrier) (block 104). The base station 14 then transmits the block of data to the UE 16 as scheduled (block 106). The UE 14 sends an ACK or NAK acknowledgement. If the base station receives an ACK (block 108)—including if a timer expires without receiving a NAK, in a HARQ system using implicit acknowledgment—the base station 14 concludes the block was received correctly by the UE 16, and processing proceeds, e.g., by receiving more data to transmit (block 102).

On the other hand, if the base station 14 receives a NAK (block 106), indicating an error in the data decoded by the UE 16, then HARQ re-transmission of the relevant bock of data to the UE 16 is performed on the REC, which is separate from the first (main) carrier (block 110). If the UE responds to the re-transmission with another NAK (block 108), subsequent re-transmissions are also sent on the REC (block 110). Note that in the event of repeated NAKs, at some point the HARQ re-transmission process terminates (not shown), and a transmission error is reported to higher-layer protocols for recovery. Note also that UE 16 conforming to LTE specification Rel-10 or earlier cannot connect to the REC.

In one embodiment, the REC comprises a pair of frequency bands (whether located in the same band as the main carrier or not), and the REC is operated in FDD mode. In another embodiment, the REC comprises a single frequency band and it is operated in TDD mode. In one embodiment, the duplex mode of the REC is different than that of the main carrier.

In one embodiment, the REC is associated with one main carrier. In this embodiment, the REC derives its generic CC signaling from that of the main carrier, instead of carrying that signaling itself. This allows more resources of the REC to be used for carrying re-transmission data. Technology enabling this result is disclosed in co-pending U.S. patent application Ser. No. 13/307,835, filed Nov. 30, 2011, titled, "Synchronization and Reference Signals on Aggregated Carriers," and assigned to the assignee of the present application, the disclosure of which is incorporated by reference herein in its entirety.

In one embodiment, the capacity of the REC is much smaller than that of the main carrier. For example, in the case of the 10% BLER example, the minimum required REC capacity would be roughly 10% of that of the main carrier. Thus the bandwidth of the REC may be scaled accordingly, as a baseline. The capacity scaling can be achieved in an FDD system by partitioning available frequency bandwidth into small carriers; in a TDD system it can be achieved by partitioning available time slots.

In one embodiment, the scheduler of the REC is derived from that of the main carrier. That is, the main carrier assigns the re-transmissions to the REC, which sends them as they come. In one embodiment, the main carrier cross-schedules the re-transmission on the REC—that is, a UE 16 would read scheduling information on PDCCH on the main carrier, and then read the re-transmitted data on PDSCH on the REC.

In another embodiment, the scheduler is more independent, and orders the re-transmissions according to REC channel quality measurements from the UEs 16 (among other factors). In this case, the re-transmission scheduling information is transmitted on the control channel of the REC. This embodiment is preferred if the main carrier conforms to the LTE Rel-10 specification, since the main carrier has limited PDCCH capacity.

The REC uplink may be implemented in a variety of ways. In one embodiment, the REC uplink channel is a dedicated carrier (FDD) or time slot (TDD), carrying only ACK/NAK messages and "overhead" signaling such as channel quality measurements. In another embodiment, the REC uplink may be "piggy-backed" on the uplink carrier of the main carrier. In still another embodiment, the REC uplink is a shared carrier, along with the uplink channels of other re-transmission carriers. Those of skill in the art will realize that any of these mechanisms may be used, so long as the uplink messages are appropriately tagged to allow for processing at the base station 14.

Shared Re-transmission Extension Carrier

As discussed above, the capacity of a REC may be only a fraction of that of its corresponding main carrier, and hence the bandwidth of the REC may be configured to be much lower than that of the main carrier (e.g., 10%, in the case of a 10% BLER). In one embodiment, however, the REC has a relatively wide bandwidth, and its capacity is shared among a plurality of main carriers. The bandwidth may be shared in various ways. In one embodiment, the REC bandwidth is shared equally among a number of main carriers (e.g., eight). The fixed sharing may be implemented as time division multiplexing, or more generally by allocating resource blocks in a fixed periodic manner.

Figure 13:
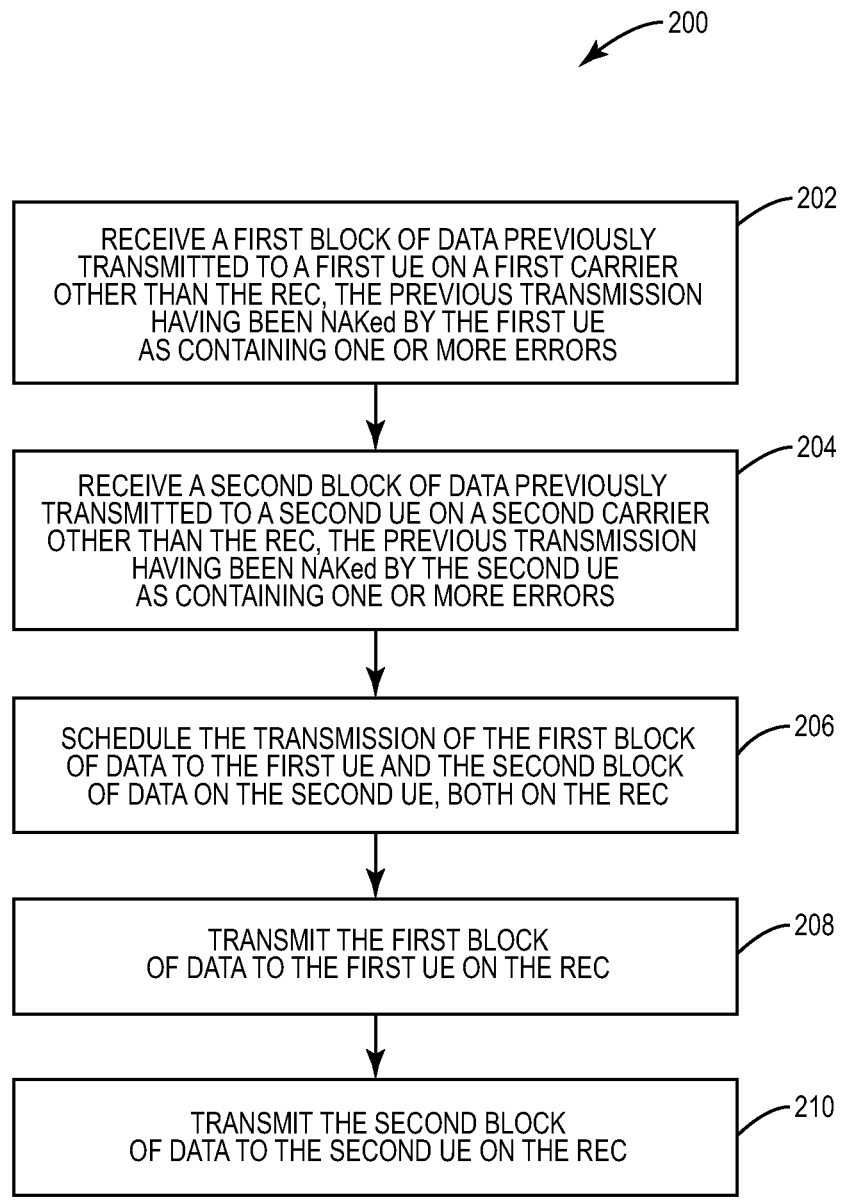
FIG. 13 is a flow diagram of a method of operating a REC scheduler for a shared REC.

In one embodiment, multiple main carriers direct their re-transmissions to the same REC, where they are handled by a single REC scheduler. This makes the sharing more flexible and adjustable to the short-term needs of main carriers. A method 200 of operating a REC scheduler is depicted in FIG. 13. The REC scheduler receives a first block of data previously transmitted to a first UE 16 on a first carrier other than the REC, the previous transmission having been NAK'ed by the first UE 16 as containing one or more errors (block 202). The REC scheduler also receives a second block of data previously transmitted to a second UE 16 on a second carrier other than the REC, the previous transmission having been NAK'ed by the second UE 16 as containing one or more errors (block 204). The REC scheduler then schedules both transmissions on the REC (block 206), in response to, e.g., channel quality feedback from served UEs 16, the size of the respective blocks of re-transmission data, parameters associated with the re-transmission data such as QoS, and the like. The base station 14 then transmits the first block of data to the first UE 16 and the second block of data to the second UE 16, according to the REC scheduler.

The multiple main carriers and the REC are all transmitted from the same base station 14 in one embodiment. In another embodiment, the REC may be transmitted from a different base station 14 than one or more of the main carriers, if there exist suitably communication links between the base stations 14 to enable fast transmission coordination.

Shared Re-transmission Extension Carrier in Contention Mode

In one embodiment, re-transmissions from multiple main carriers are not scheduled or otherwise cooperatively managed on the REC, but rather the REC is operated in contention mode. In contention mode, main carriers at two or more base stations 14 share an REC channel (carrier bandwidth or time slot). Rather than coordinating re-transmissions in any way, prior to a re-transmission, each base station 14 monitors the REC for an ongoing transmission from another base station 14. If the REC is "quiet," the base station 14 proceeds to transit its re-transmission data on the REC. On the other hand, if it senses an ongoing transmission on the REC, the base station 14 will back off from the transmission according to a pre-determined method (e.g., await the expiration of a timer, which may be initialized to a random number).

The embodiment described above works for separate base stations 14, and additionally for base stations 14 that are co-located. In another embodiment, wherein two main carriers on the same base station site use the same transmit antenna, the contention mode comprises sensing the transmit antenna for an ongoing transmission of the REC channel. The main carrier then transmits or backs off according to the detected level of activity.

Operating the REC in contention mode is much simpler from a coordination perspective, as compared to scheduling transmissions on the REC. However, it may result in a lower overall capacity.

Shared Re-transmission Extension Carrier in Unlicensed Spectrum

The contention modes described above are not limited to embodiments wherein the REC comprises a component carrier of the wireless communication network 10. In one embodiment, the REC is implemented in unlicensed spectrum. For example, the REC may be in the Industrial, Scientific and Medical (ISM) radio bands. A characteristic of unlicensed spectrum is the lack of any exclusive regulatory protection from interference generated by other users of the spectrum, such as cordless (conventional) phones, Bluetooth® devices, microwave ovens, and the like. The above-described contention technique (back-off if busy) may be applicable in such environments.

Passive Contention Measures for Shared Re-transmission Extension Carrier

In some embodiments, active contention techniques may not be feasible, such as due to cost constraints or implementation difficulties, or may not be effective, such as when operating in unlicensed spectrum with near-continuous interference. In these embodiments, interference mitigation mechanisms are added to the signals carrying the REC transmission. Such interference mitigation mechanisms may include (but are not limited to): selection of lower coding rate, spreading the transmission over wider frequency/time resources using spread spectrum techniques, and applying transmitter side beam-forming to the intended receivers. Concurrently or additionally, interference suppression techniques may be employed by receivers, such as using the spread frequency-time resources or multiple receive antennas.

Exemplary Apparatus Implementing REC Embodiments

Figure 14:
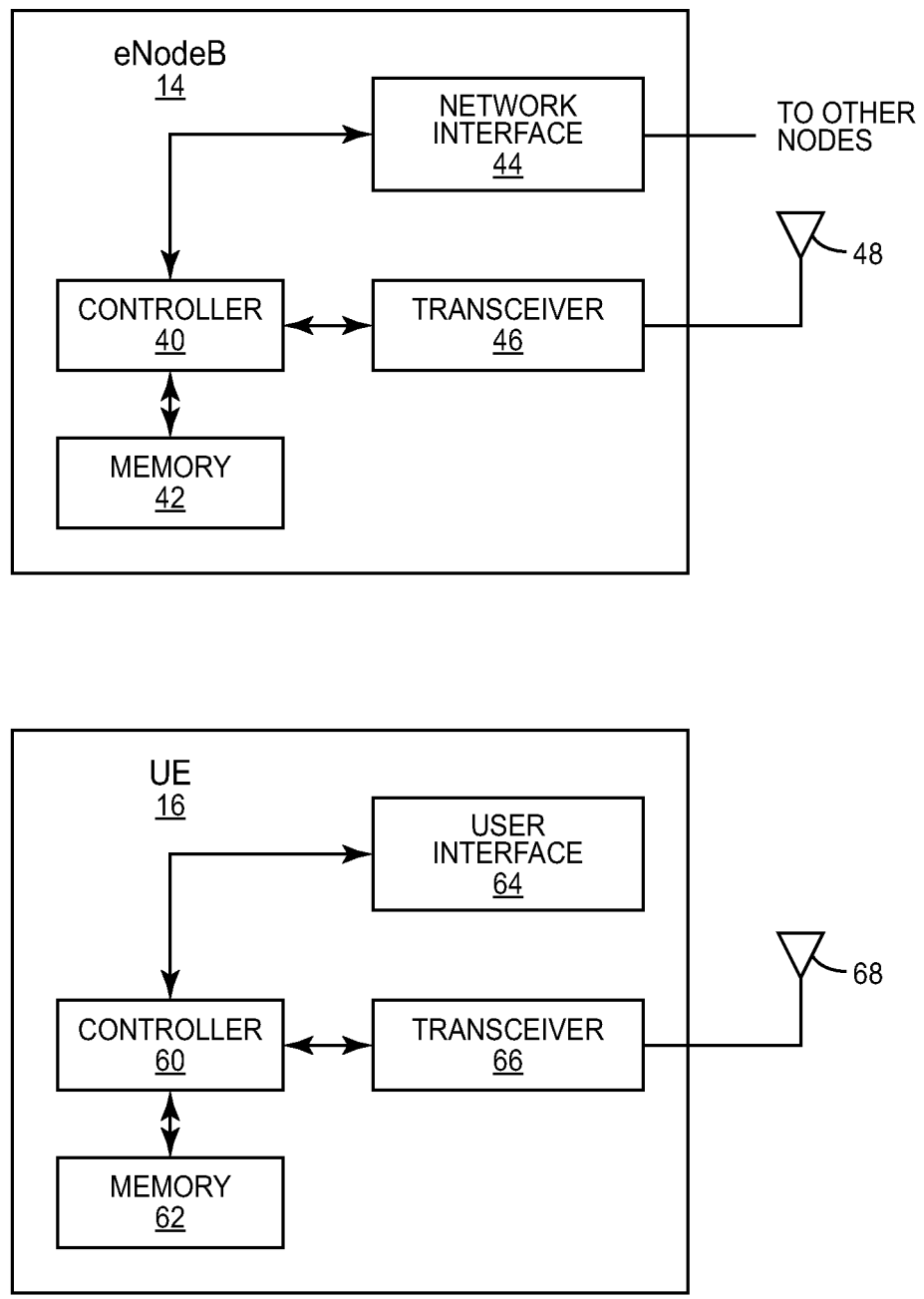
FIG. 14 depicts functional block diagrams of an eNodeB and a UE.

FIG. 14 depicts functional block diagrams of a base station, such as an LTE eNodeB 14, and UE 16. The eNodeB 14 includes a controller 40, memory 42, network interface 46, and a transceiver 46 coupled to one or more antenna 48. Additional components of the eNodeB 14 are omitted for clarity.

The controller 40 may comprise any sequential state machine operative to execute machine instructions stored as machine-readable computer programs in the memory 42, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 42 may comprise any non-transient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, etc.), or the like. The memory 42 is operative to store program code operative to cause the controller to operate as described herein.

The network interface 44 is operative to communicatively couple the eNodeB 14 to other LTE core network nodes, such as the MME/S-GW 22. The eNodeB may additionally be coupled to other eNodeBs 14, or other network nodes. The network interface 44 is operative to implement a variety of communication protocols over physical channel such as, but not limited to, wired electrical or optical networks.

The transceiver 66 is operative to modulate and transmit data according to OFDMA techniques, and otherwise generate and process signals for transmission to UE 16 within its cell 18, according to the various 3GPP LTE specifications. The transceiver is operative to transmit data to UE 16 on a main carrier, and in some embodiments, is further operative to re-transmit data to the UE 16 on a REC. The transceiver 66 is further operative to receive and process signals from UE 16 in its cell 18, including, in some embodiments, uplink REC signals. The antenna 48 may comprise one antenna (or one antenna per sector), or may comprise multiple antennae in a Multiple Input Multiple Output (MIMO) configuration.

The UE 16 includes a controller 60, memory 62, user interface 64, and a transceiver 66 coupled to one or more antenna 68. Additional components of the UE 16 are omitted for clarity. The controller 60, memory 62, transceiver 66, and antenna 68 may be as describe above with respect to the eNodeB 14, with variations for low power and mobility, as known by those of skill in the art. The user interface 64 may include a microphone, speaker, keypad, display, and/or touchscreen, operative to receive voice and control inputs from a user, and operative to display information and render sounds to the user. UE 16 may include numerous additional components (e.g., camera) omitted from FIG. 14 for clarity.

According to embodiments of the present invention, required ARQ/HARQ retransmissions are diverted from one or more main carriers to a REC, freeing the main carrier scheduler(s) of the random interruption, and allowing it/them to perform more efficient, deterministic scheduling. Inter-cell scheduling and coordination are also improved.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of operating a base station, comprising:
   receiving data to be transmitted to one or more User Equipment (UE);
   scheduling base station transmission of at least one block of the data to a UE of the one or more UE in a first scheduler;
   transmitting, by the base station, the at least one block of the data to the UE on at least a first component carrier (CC), wherein the base station implements carrier aggregation;
   receiving, at the base station, a negative acknowledgement (NAK) from the UE indicating one or more errors in at least one received data block; and
   re-transmitting at least one block of the data to the UE on a dedicated Re-transmission Extension Carrier (REC) that is a CC separate from any CC on which the at least one block of the data was transmitted to the UE, wherein the REC transmits only Automatic Repeat Request (ARQ) and/or Hybrid ARQ (HARQ) retransmission data at all times.

2. The method of claim 1 wherein re-transmitting the block of data to the UE on REC comprises cross-carrier scheduling the re-transmission on the REC from the first CC.

3. The method of claim 1 further comprising, prior to re-transmitting the block of data:
   sending information about the re-transmission and the UE to a second scheduler associated with the REC.

4. The method of claim 1 further comprising, prior to re-transmitting the block of data:
   monitoring the REC for an ongoing transmission; and
   re-transmitting the block of data to the UE on the REC only if there is no transmission ongoing on the REC.

5. The method of claim 1 further comprising:
   receiving a channel quality indicator from the UE on the REC.

6. The method of claim 5 wherein downlink and uplink transmissions on the REC are Frequency Division Duplexed (FDD).

7. The method of claim 5 wherein downlink and uplink transmissions on the REC are Time Division Duplexed (TDD).

8. The method of claim 1 wherein the REC is a carrier in unlicensed spectrum.

9. The method of claim 8 further comprising, prior to re-transmitting the block of data:
   monitoring the REC for an ongoing transmission; and
   re-transmitting the block of data to the UE on the REC only if there is no transmission ongoing on the REC.

10. The method of claim 8 further comprising, prior to re-transmitting the block of data:
    adding interference mitigation to a signal to be transmitted.

11. The method of claim 10 wherein the interference mitigation comprises encoding the block of data at a lower coding rate.

12. The method of claim 10 wherein the interference mitigation comprises spreading the transmission over wider frequency/time resources using spread spectrum techniques.

13. The method of claim 10 wherein the interference mitigation comprises applying transmitter side beam-forming to the intended receivers.

14. The method of claim 1 wherein the base station is capable of performing Multiple Input Multiple Output (MIMO) transmissions, and
    wherein receiving a NAK from the UE comprises receiving a NAK associated with each block of data transmitted, and
    wherein re-transmitting the at least one block of the data to the UE on a REC comprises re-transmitting each block of data associated with a NAK.

15. The method of claim 1 wherein the base station is capable of performing Multiple Input Multiple Output (MIMO) transmissions, and
    wherein receiving a NAK from the UE comprises receiving a single NAK indicating an error in at least one block of data, and
    wherein re-transmitting the at least one block of the data to the UE on a REC comprises re-transmitting all blocks of data in response to the single NAK.

16. A method of transmitting HARQ re-transmissions on a dedicated Re-transmission Extension Carrier (REC), comprising:
    receiving, by a first base station, at least one block of data to be transmitted to one or more User Equipment (UE);
    scheduling first base station transmission of the at least one block of data to a first UE of the one or more UE in a first scheduler;
    transmitting, by the first base station, the at least one block of data to the first UE on at least a first component carrier (CC), wherein the base station implements carrier aggregation;
    receiving, at the first base station, a negative acknowledgement (NAK) from the UE indicating one or more errors in at least one received data block;

receiving, at a second base station, a first block of the data previously transmitted, by the first base station, to the first UE on the first CC, the previous transmission having been negatively acknowledged (NAK) by the first UE as containing one or more errors; and transmitting, by the second base station, the first block of the data to the first UE on the REC that is separate from any CC on which the data was previously transmitted to the first UE from the first base station, wherein only Automatic Repeat Request (ARQ) and/or Hybrid ARQ (HARQ) retransmission data is transmitted on the REC at all times.

17. The method of claim 16 further comprising:
receiving a second block of data previously transmitted to a second UE on a second carrier other than the REC, the previous transmission having been negatively acknowledged (NAK) by the second UE as containing one or more errors;
scheduling the transmission of the first block of data to the first UE on the REC;
scheduling the transmission of the second block of data to the second UE on the REC; and
transmitting the second block of data to the second UE on the REC.

18. The method of claim 17 wherein scheduling the transmission of the first block of data to the first UE and the second block of data on the second UE on the REC comprises sharing REC bandwidth equally between the first and second blocks of data.

19. The method of claim 17 further comprising:
receiving a first channel quality indicator from the first UE; and
receiving a second channel quality indicator from the second UE;
wherein scheduling the transmission of the first block of data to the first UE on the REC and scheduling the transmission of the second block of data on the second UE on the REC, comprises scheduling the transmissions in response to the received first and second channel quality indicators.

20. A base station operative in a wireless communication network, comprising:
a first transceiver operative to transmit data to one or more User Equipment (UE) on at least a first component carrier (CC);
a network interface operative to exchange data with one or more network nodes;
memory; and
a controller operatively connected to the memory, the transceiver, and the network interface, and operative to:
receive, via the network interface, data to be transmitted to the one or more UE;
implement carrier aggregation;
schedule transmission of at least one block of data to a UE of the one or more UE on at least the first CC;
cause the first transceiver to transmit the at least one block of the data to the UE on at least the first CC;
receive, from the transceiver, a negative acknowledgement (NAK) from the UE indicating one or more errors in the received data block; and
cause at least one block of data to be re-transmitted to the UE on a dedicated Re-transmission Extension Carrier (REC) that is a CC separate from any CC on which the at least one block of data was transmitted to the UE, wherein the REC transmits only Automatic Repeat Request (ARQ) and/or Hybrid ARQ (HARQ) retransmission data at all times.

21. The base station of claim 20, further comprising:
a second transceiver operative to transmit data to UE on a Re-transmission Extension Carrier (REC) separate from any CC on which a block of data was transmitted to the UE; and
wherein the controller is operative to cause the at least one block of the data to be re-transmitted to the UE by causing the second transceiver to transmit at least one block of data to the UE on the REC.

22. The base station of claim 21 wherein the controller is further operative to schedule transmission of the at least one block of data to the UE on the REC.

23. The base station of claim 22 wherein the controller is further operative to schedule on the REC the transmission of one or more blocks of data to be re-transmitted to other UE as a result of the other UE having NAK'ed a downlink transmission of data on other CCs.

24. The base station of claim 21 wherein the controller is further operative to monitor the REC for an ongoing transmission; and
cause the second transceiver to transmit the at least one block of data to the UE on the REC only if there is no transmission ongoing on the REC.

25. The base station of claim 20 wherein
the controller is operative to cause the at least one block of data to be re-transmitted to the UE by sending the at least one block of data, via the network interface, to a network node operative to transmit the at least one block of data to the UE on a Re-transmission Extension Carrier (REC).

26. The base station of claim 20 further comprising:
a third transceiver operative to transmit data to UE in unlicensed spectrum; and
wherein the controller is operative to cause the at least one block of data to be re-transmitted to the UE by causing the third transceiver to transmit the at least one block of data to the UE in unlicensed spectrum.

27. The base station of claim 26 wherein the controller is further operative to monitor the unlicensed spectrum for an ongoing transmission; and
cause the third transceiver to transmit the at least one block of data to the UE in unlicensed spectrum only if there is no transmission ongoing in the unlicensed spectrum.

28. The base station of claim 26 wherein the controller is further operative to
add interference mitigation to a signal to be transmitted.

29. User Equipment operative in a wireless communication network, comprising:
a transceiver operative to receive and transmit data from and to a base station on a first component carrier (CC), wherein the base station implements carrier aggregation;
memory; and
a controller operatively connected to the memory and the transceiver, and operative to receive, from the transceiver, data transmitted by the base station on the first CC, wherein the data comprises at least one block of data;
perform error detection on the received data;
in the case of a detected error, cause the transceiver to transmit a negative acknowledgement (NAK) to the base station on the first CC; and
receive, from the transceiver, a re-transmission of the erroneous data on a dedicated Re-transmission Extension Carrier (REC) that is a CC separate from any CC on which the at least one block of data was transmitted to the UE, wherein the REC transmits only HARQ/ARQ retransmission data at all times.

30. The UE of claim 29 wherein the controller is operative to receive the re-transmission in unlicensed spectrum.

* * * * *